United States Patent
Dacosta (12) 
(10) Patent No.: US 6,912,198 B2
(45) Date of Patent: Jun. 28, 2005

(54) PERFORMANCE OF DATA TRANSMISSION USING ADAPTIVE TECHNIQUE

(75) Inventor: Behram M. Dacosta, San Diego, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 242 days.

(21) Appl. No.: 10/397,465

(22) Filed: Mar. 26, 2003

(65) Prior Publication Data

US 2004/0190451 A1 Sep. 30, 2004

(51) Int. Cl.$^7$ ................... H04J 1/16; H04J 3/14
(52) U.S. Cl. .............. 370/229; 370/412; 370/338; 370/349
(58) Field of Search ................. 370/229, 230, 370/235, 352–356, 338, 349, 394, 395.2, 412, 413, 474, 428, 429, 465; 709/235, 234; 714/746–750

(56) References Cited

U.S. PATENT DOCUMENTS

| 6,801,940 | B1 | * | 10/2004 | Moran et al. ............... 709/224 |
| 2002/0054578 | A1 | * | 5/2002 | Zhang et al. ............... 370/328 |
| 2002/0154653 | A1 | * | 10/2002 | Benveniste .................. 370/447 |
| 2002/0191544 | A1 | * | 12/2002 | Cheng et al. ............... 370/236 |
| 2003/0063565 | A1 | * | 4/2003 | Kakani et al. .............. 370/235 |

* cited by examiner

*Primary Examiner*—Ajit Patel
(74) *Attorney, Agent, or Firm*—Blakely, Sokoloff, Taylor & Zafman LLP (57) ABSTRACT

An embodiment of the present invention is a technique to adaptively generate a parameter value for data transmission. Queue entries in a queue are updated. The queue is indexed by a parameter according to a transmission status of a current packet in a data stream. The current packet is transmitted using a current value of the parameter. A plurality of performance scores are calculated based on the queue entries. A best value of the parameter that corresponds to a best score in the plurality of performance scores is selected.

30 Claims, 9 Drawing Sheets

| MODULATION METHOD N | 1 | 2 | 3 | 4 | 5 | 6 | 7 | 8 |
|---|---|---|---|---|---|---|---|---|
| 1 | | | TRUE | | | | | |
| 2 | | | TRUE | | | | | |
| 3 | | | TRUE | | | | | |
| 4 | | TRUE | | | | | | |
| 5 | | TRUE | | | | | | |
| ... | ... | ... | ... | ... | ... | ... | ... | ... |
| N-2 | | | | | | TRUE | | |
| N-1 | | | | | | FALSE | | |
| N | | | | | | FALSE | | |

212

| MODULATION METHOD N | 1 | 2 | 3 | 4 | 5 | 6 | 7 | 8 |
|---|---|---|---|---|---|---|---|---|
| 1 | TRUE | TRUE | FALSE | FALSE | TRUE | TRUE | FALSE | TRUE |
| 2 | TRUE | TRUE | FALSE | TRUE | FALSE | TRUE | TRUE | FALSE |
| 3 | FALSE |  | FALSE | TRUE | FALSE |  | TRUE | TRUE |
| 4 | FALSE |  | FALSE | TRUE | TRUE |  |  | TRUE |
| .. | .. | .. | .. | .. | .. | .. | .. | .. |
| K | TRUE |  | FALSE | TRUE | FALSE |  |  |  |
| .. | .. | .. | .. | .. | .. | .. | .. | .. |
| N-1 | FALSE |  | TRUE |  | TRUE |  |  | TRUE |
| N | TRUE |  | TRUE |  | FALSE |  |  | FALSE |
|  | $n_1=N$ | $n_2=2$ | $n_3=N$ | $n_4=K$ | $n_5=N$ | $n_6=2$ | $n_7=3$ | $n_8=N$ |

*FIG. 3B*

| PACKET SIZE | 1 | | | | ... | | K | | | |
|---|---|---|---|---|---|---|---|---|---|---|
| MODULATION METHOD | 1 | ... | L | ... | M | ... | 1 | ... | L | ... | M |
| TRANSMIT POWER | 1 | ... | M | 1 | ... | M | ... | 1 | ... | M | 1 | ... | M | 1 | ... | M |
| 1 | T | ... | T | | ... | | ... | | ... | | | ... | | | ... | |
| 2 | T | ... | F | | ... | | ... | | ... | | | ... | | | ... | |
| 3 | | ... | | | ... | | ... | | ... | | | ... | | | ... | |
| 4 | | ... | | | ... | | ... | | ... | | | ... | | | ... | |
| .. | | ... | | | ... | | ... | | ... | | | ... | | | ... | |
| N-1 | T | ... | F | | ... | | ... | | ... | | | ... | | | ... | |
| N | T | ... | F | | ... | | ... | | ... | | | ... | | | ... | |

PERFORMANCE OF DATA TRANSMISSION USING ADAPTIVE TECHNIQUE

BACKGROUND

1. Field of the Invention

Embodiments of the invention relates to the field of communication, and more specifically, to data transmission.

2. Description of Related Art

The performance of data transmission in a communication system is typically a function of a number of parameters. Examples of these parameters include modulation technique, data rate, channel interference, channel noise, packet size, etc. For a particular communication system, these parameters are usually selected to deliver the best performance.

Performance criteria may be different for different systems and/or applications. It is usually difficult to satisfy all performance criteria at the same time. For example, low error transmissions tend to reduce the data rate and high data rate transmissions tend to increase the error rate. In addition, characteristics of a communication system are usually dynamic according to system usage, network traffic, noise level, etc. Current techniques do not provide complete solution for the dynamic characteristics of the system. Typically, current techniques select a fixed value or values of system parameters according to some predetermined performance measure. It is sometimes difficult to determine this fixed value when characteristics of the system are unknown. Furthermore, when the characteristics of the communication channel are changed, the fixed value or values may not provide satisfactory performance.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention is a technique to adaptively generate a parameter value for data transmission. Queue entries in a queue are updated. The queue is indexed by a parameter according to a transmission status of a current packet in a data stream. The current packet is transmitted using a current value of the parameter. A plurality of performance scores are calculated based on the queue entries. A best value of the parameter that corresponds to a best score in the plurality of performance scores is selected.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
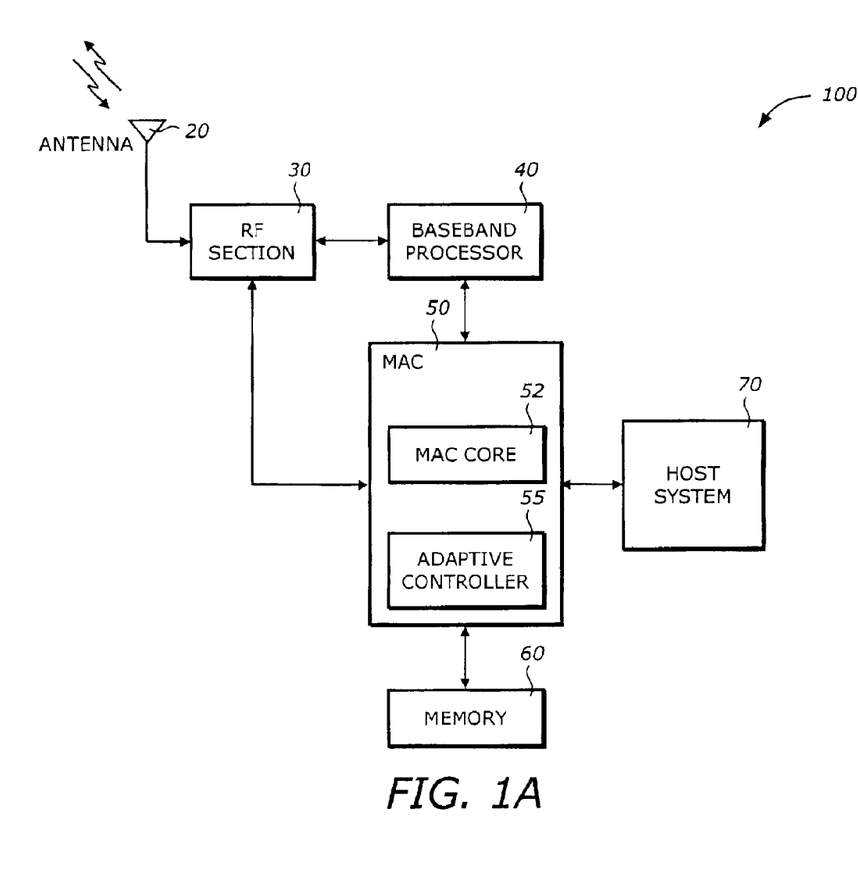
FIG. 1A is a diagram illustrating a system in which one embodiment of the invention can be practiced.

FIG. 1A is a diagram illustrating a system 10 in which one embodiment of the invention can be practiced. The system 10 includes an antenna 20, a radio frequency (RF) section 30, a base-band processor 40, a medium access controller (MAC) 50, a memory 60, and a host system 70.

The antenna 20 receives a radio signal sent from a radio transmitter and/or sends a radio signal to a receiver. There may be more than one antenna 20 for selectivity. Typically, the antenna 20 has a small form factor designed for hand-held devices. The frequency range for the antenna 20 depends on the type of radio signals it receives or transmits. For example, for Bluetooth and 802.11 signals, the frequency range is about 2400 to about 5000 MHz.

The RF section 30 processes the receiving and/or the transmitting radio signal. Typically, the RF section 30 is compatible to at least one of a Bluetooth standard and a Wireless Fidelity (Wi-Fi) standard such as the 802.11x standard (e.g., 802.11a, 802.11b, 802.11g). The RF section 30 includes a converter to convert the receiving radio signal to a baseband signal or a transmitting baseband signal to the transmitting radio signal. The RF section 30 may be an integrated device or includes several components. Typical components are antenna switch, bandpass filter, transmitter/receiver switch, power amplifier, quadrature up/down converter, phase-locked loop elements, and clock generator.

The baseband processor 40 is coupled to the RF section 30 to process the baseband signals. The baseband processor 40 typically includes quadrature digital-to-analog converters, quadrature analog-to-digital converters, quadrature modulators and demodulators. The MAC 50 includes physical interface serial controller, a microprogrammed engine to decode the baseband signal. The MAC 50 may also include a Wired Equivalent Privacy (WEP) engine for security control. The MAC microprogrammed engine executes instructions in pre-programmed ROM and in the memory 60. The MAC 50 includes a MAC core 52 and an adaptive controller 55 either in form of hardware or instructions in the microprogram executed by the MAC microprogrammed processor or engine. The memory 60 contains wireless communication program or code to perform the adaptive control. Typically, the memory 60 includes a flash memory or any other types of ROM and RAM for storing temporary data. The memory 60 may be internal or external to the adaptive controller 55. It contains instructions that cause the microprogrammed processor to perform tasks or functions for adaptive control. The baseband processor 40 and the MAC 50 may perform transmitting packets of data in a data stream using one or more parameters that control the communication. These parameters may be programmable or selected based on some performance criteria.

The host system 70 is a computer system to provide a platform for interfacing to the MAC 50. The MAC 50 may be part of an adapter card plugged into a card slot of the host system. The host system 70 may be optional if the MAC 50 and the baseband processor 40 can operate in a standalone mode.

Figure 1B:
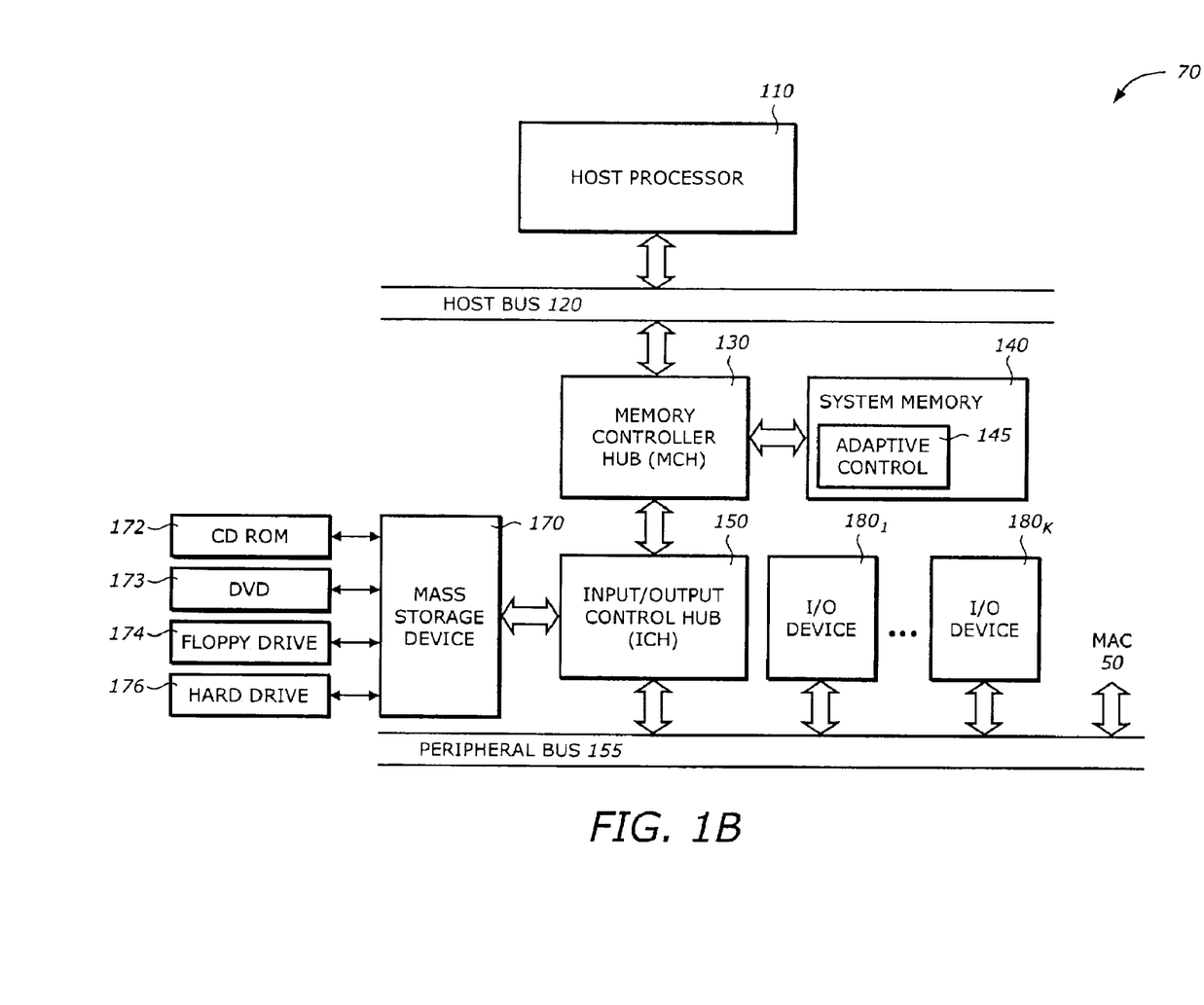
FIG. 1B is a diagram illustrating a host computer system in which one embodiment of the invention can be practiced.

FIG. 1B is a diagram illustrating a host computer system 70 in which one embodiment of the invention can be practiced. The system 70 includes a host processor 110, a host bus 120, a memory control hub (MCH) 130, a system memory 140, an input/output control hub (ICH) 150, a peripheral bus 155, a mass storage device 170, and input/output devices $180_1$ to $180_K$. Note that the system 70 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc. The peripheral bus 155 may provide interface to the MAC 50.

The system memory 140 stores system code and data. The system memory 140 is typically implemented with dynamic random access memory (DRAM) or static random access memory (SRAM). The system memory may include program code or code segments implementing one embodiment of the invention. The system memory includes an adaptive control module 145. Any one of the elements of the adaptive control module 145 may be implemented by hardware, software, firmware, microcode, or any combination thereof. The system memory 140 may also include other programs or data which are not shown, such as an operating system. The adaptive control module 145 may implement all or part of the adaptive control functions. These may be equivalent or supplementary to the adaptive controller 55 in the MAC 50. The adaptive control module 145 may simulate the adaptive control functions with or without the MAC 50.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, and hard drive 176, and any other magnetic or optic storage devices. The mass storage device 170 provides a mechanism to read machine-accessible media. The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card such as Institute of Electrical and Electronics Engineers (IEEE) 802.3, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, microprogrammed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
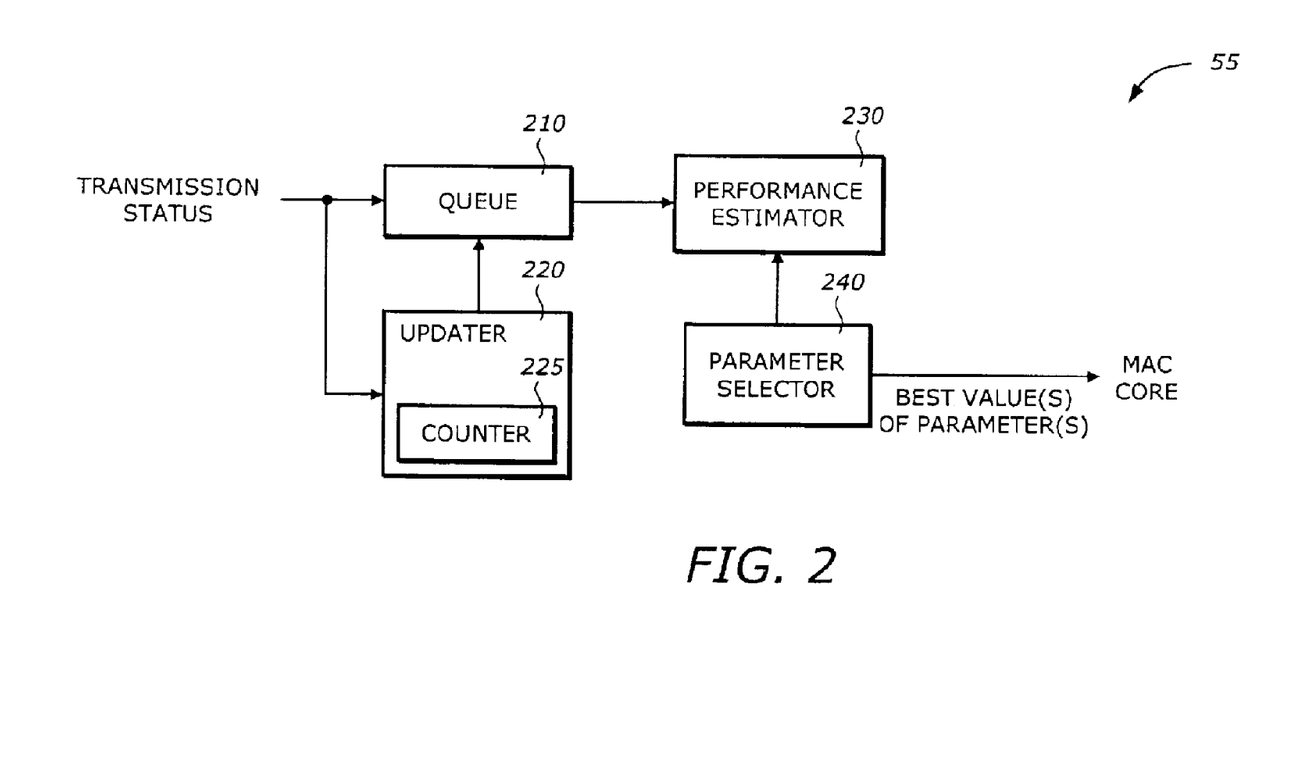
FIG. 2 is a diagram illustrating an adaptive controller according to one embodiment of the invention.

FIG. 2 is a diagram illustrating an adaptive controller 55 according to one embodiment of the invention. The adaptive controller 55 includes a queue 210, an updater 220, a performance estimator 230, and a parameter selector 240. These elements may be implemented by hardware, software, firmware, or any combination thereof.

The queue 210 stores queue entries indexed by a parameter according to a transmission status of a current packet in a data stream. The queue entries contain information about the transmission packets, such as the transmission status. The transmission status may be obtained by any suitable mechanism such as error checking, return acknowledgement, etc. The data stream may be transmitted at any suitable data rate. Examples of the data rate include 6 Megabits per second (Mbps), 9 Mbps, 12 Mbps, 18 Mbps, 24 Mbps, 36 Mbps, 48 Mbps, 54 Mbps, 108 Mbps, or higher. The current packet is transmitted using a current value of the parameter. The parameter affects or controls the communication and may be a modulation method, a packet size, or a transmit power. The modulation method is any modulation technique. An example is the Orthogonal Frequency Division Multiplexing (OFDM) used in IEEE 802.11. The OFDM may be a binary phase shift keying (BPSK), a quadrature phase shift keying (QPSK), a 16-quadrature amplitude modulation (16-QAM), or a 64-QAM. The coding rate may be ½, ⅔, or ¼. The values of the parameter may be encoded in any convenient manner. For example, if there are 8 modulation methods, then the parameter may be coded as 3-bit value ranging from 000 (0) to 111 (7) to represent the 8 modulation methods. The packet size may include any suitable packet sizes. The transmit power is the power level consumed by the communication system or a subset of the system.

The updater 220 updates the queue entries in the queue 210 as a current packet is transmitted. The queue 210 in essence contains information about the last N transmission results. These N transmission results correspond to a history window that slides along the data stream as packets are transmitted to keep track of a history, or the most recent N packet transmissions. The N transmission results may correspond to all values of the parameter, or may correspond to each value of the parameter. The updater 220 has a counter 225 to count the number of transmission results saved in the queue. The counter 225 may correspond to all values of the parameter or may contain several sub-counters, each corresponding to each value of the parameter. The counter 225 therefore corresponds to the history window of transmitted packets. The updater 220 updates the queue entries in the queue 210 when the transmission status of the current packet is determined.

The counter 225 may be updated (e.g., incremented) each time a packet is transmitted and its transmission status is obtained or at any specified period if frequent updates are not desired. This is performed by applying a hysteresis on the updating of the queue entries. If the counter 225 in the updater 220 exceeds a maximum window size of the history window indicating that the queue for that parameter value is full, the updater 220 removes an oldest entry in the queue to make room for a new entry representing the current packet. The updater 220 inserts this new entry in the queue 210 indicating the transmission status of the current packet.

The performance estimator 230 calculates a number of performance scores based on the queue entries. The number of the performance scores may be the same as or smaller than the number of queue entries. In other words, the performance estimator 230 may estimate the performance scores of all queue entries or a subset of the queue entries.

The parameter selector 240 selects a best value of the parameter that corresponds to a best score in the plurality of performance scores. When multiple parameters are used, the parameter selector 240 selects the best values of all these parameters. The selected best value or values are then forwarded to the MAC core 50 or any module responsible for the transmission of packets so that a next packet in the data stream may be transmitted using the best value or values.

The basic concept is to adaptively control the packet transmission based on the history of transmission performance. This will help dynamically adjust the system performance in presence of dynamic changes of the system or to accommodate system performance criteria. This can be performed by determining the success rate, or failure rate, depending on the parameter type, of each value of the parameter in the past N attempts and select the best value of the parameter that results in the best performance score. The parameter may be any parameter that affects the transmission performance in a dynamic environment. Examples of the parameter are modulation method, packet size, and transmit power.

The modulation method or scheme affects the rate of data transmission on networks. For example, in 802.11a scheme, changing the modulation method from 16-QAM to 64-QAM increases the data rate by increasing the number of coded bits per symbol and hence data bits per symbol. However, changing the modulation method from 16-QAM to 64-QAM can also increase the transmission error rates. Although the modulation rate is typically chosen to minimize the error rate, or even eliminate errors entirely, this is not always consistent with maximizing overall data throughput. In some applications, it may be more desirable to have increased error rate in exchange for increased transmission rate. In these applications, completely error free transmission is not required, and/or automatic packet re-transmission is implemented upon packet error detection. For this type of parameter, the success rate is used.

The packet size may also affect the transmission performance in the following way. Overheads in data transmission are usually fixed in size for each packet, but decrease the amount of useful bandwidth in the network. For this reason, it may be desirable to increase the amount of data in each packet to decrease the percentage of total overhead. However, increasing the packet size may also increase the probability of transmission failure for reasons such as interference or noise in the radio channels, and/or contention in unreliable contention-based access channels. Therefore, packet size has a dynamic effect on system performance and can be used as a parameter to be dynamically or adaptively controlled. For this type of parameter, the failure rate is used.

The success rate, or failure rate, of the past N transmission attempts can be calculated by determining the number of successful, or unsuccessful, transmissions as recorded by the queue entries in the queue 210 as shown in FIG. 2. The queue 210 is indexed by the parameter. This can be expressed as a scaled number of successes, or failures, in the past N transmissions. The past N transmission attempts may be weighed equally, differently, or adaptively. In one embodiment, a temporal weighting factor may be used. This temporal weighting factor weighs each result of each of the past transmission attempts differently before calculating the overall rate. This has the effect of giving greater imporance to some time periods than others, relative to the current time period. Hence this is a more general form than simply calculating the rate over the past N attempts. In addition, the temporal weighing factor may itself change over time.

Let Q(j) be the queue containing entries for the value j of the parameter having K values, j =1, . . . , K. The queue entries are the transmission status of the past N transmissions. The success rate, or failure rate, for each value of the parameter can be computed by calculating the percentage of success, or unsuccessful, transmissions in the past N attempts. For K values of the parameter, there are K success, or failure, rates. Let S(j) be the success rate, or failure rate, of the value j of the parameter. For each value j, a performance score or figure of merit P(j) can be computed to estimate the performance of the parameter value j in the past N transmissions. This performance score P(j) may be determined by applying a function f{.} to the success, or failure, rate S(j) and a theoretical value T(j). The theoretical value T(j) may be computed using the optimal result for the given parameter value j. For example, if the parameter is the modulation method, the theoretical value T(j) may be the data rate at the modulation method j assuming no errors. If the parameter is the packet size, the theoretical value T(j) may be the protocol overhead percentage of using a packet of size j. The performance score P(j) can then be expressed as:

$$P(j)=f\{S(j),T(j)\} \quad (1)$$

The function f{.} may be selected to provide a useful indicator of the transmission performance. Examples of the function f{.} are multiplication and linear combination, as expressed below.

$$P(j)=(a+bS(j))(c+dT(j))+e \quad (2)$$

$$P(j)=aS(j)+bT(j) \quad (3)$$

where a, b, c, d and e are scale factors, and j=1, . . . , K
After the performance scores are computed for all, or a subset of, values of the underlying parameter, the parameter value that corresponds to the best performance score is selected. A subset of parameter values may be used for a step adjustment to avoid sudden change. An example of a subset is the current value, the next higher value, and the next lower value. The optimality of the performance score depends on the type of parameter. For example, if the parameter is the modulation method, then the higher the performance score, the better the performance. If the parameter is the packet size, then the lower the performance score, the better the performance. After the best value, jbest, of the parameter is selected, the transmission of the next packet will use this value jbest of the parameter.

To avoid sudden changes in the dynamic adjustment, a hysteresis mechanism can be applied. The hysteresis mechanism acts like a filter to slow down the update and the adaptive control. This can be performed in a number of ways. In the first way, the updating of the queue entries may be performed at some fixed, or variable, interval instead of every packet transmitted. In the second way, the updating of the queue entries may be performed for every packet, but the decision to change the parameter value is performed at some fixed, or variable, interval (e.g., every P packets).

It is contemplated that the above scheme can be extended to multiple parameters. For example, when the parameter is the packet size, additional parameters may be used such as modulation method and transmit power. In this scheme, for R parameters, there are R best values, one for each parameter. Alternatively, the best value for the packet size may be obtained while keeping the modulation method and the transmit power to be the same as the current modulation method and current transmit power.

As discussed above, the queue 210 contains the past N transmission results corresponding to the selected values of the parameter or parameters. The past N transmission results may correspond to all values of the parameter or to each value of the parameter. In addition, the queue 210 may be indexed by multiple parameters. The structure of the queue 210 therefore may have three forms, referred to as a first queue 212, a second queue 214, and a third queue 216.

Figure 3A:
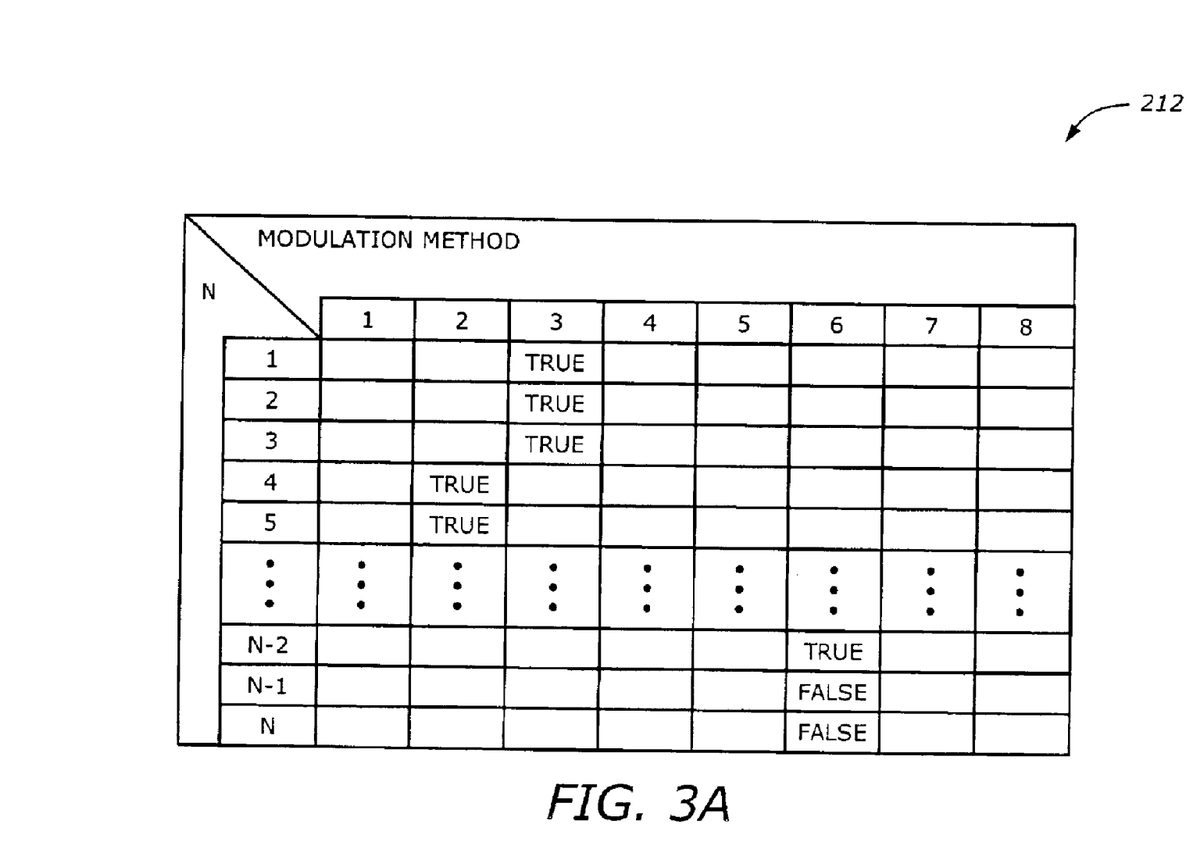
FIG. 3A is a diagram illustrating a first queue indexed by modulation method parameter according to one embodiment of the invention.

FIG. 3A is a diagram illustrating the first queue 212 indexed by modulation method parameter according to one embodiment of the invention. In this queue structure, the N queue entries correspond to all values of the parameter.

The first queue 212 includes N queue entries indexed by the parameter. As an example, the parameter is the modulation method. The parameter has 8 values, coded in numeric values from 1 through 8 to correspond to the modulation method and coding rate. The values 1, 2, 3, 4, 5, 6, 7, 8 may correspond to the BPSK ½, BPSK ¾, QPSK ½, QPSK ¾, 16-QAM ½, 16-QAM ¾, 16-AM ⅔, and 64-QAM ¾, respectively.

Each row of the first queue 212 corresponds to the same time instant, or packet number. Since at any time instant or for any transmitted packet, there is only one modulation method used, there is only one meaningful entry in each row. The remaining entries are blank or unused. These blank or unused entries are not used in the subsequent performance estimation. The queue entries in the first queue 212 represent the transmission results or statuses of the transmitted packets. In a typical scenario, a packet may be transmitted successfully (e.g., no error) or unsuccessfully. For a two-value transmission result, the entry may have two values, TRUE, or logical one, and FALSE, or logical zero. A TRUE value may correspond to a successful transmission and a FALSE value may correspond to a failed transmission, or vice versa. The performance estimation calculates the performance score for each value of the parameter so that the best value can be determined. This best value will then be used for the next packet to be transmitted.

Figure 3B:
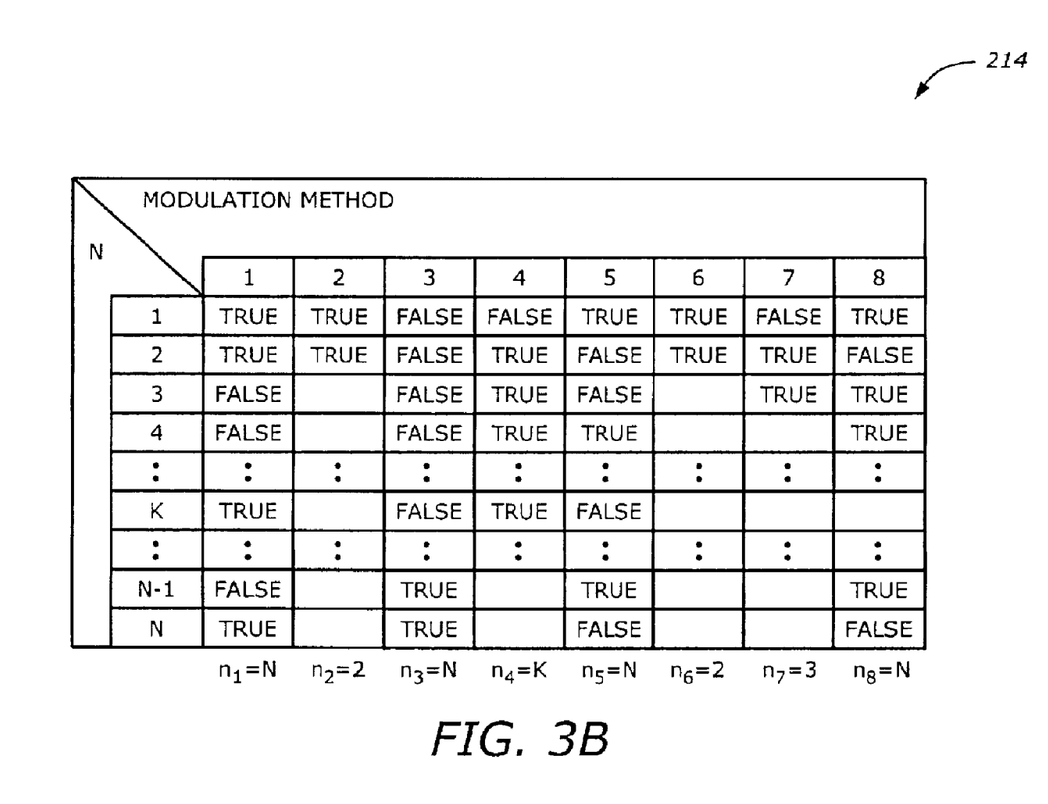
FIG. 3B is a diagram illustrating a second queue indexed by modulation method parameter according to one embodiment of the invention.

FIG. 3B is a diagram illustrating the second queue 214 indexed by modulation method parameter according to one embodiment of the invention. As in the first queue 212, the second queue 214 has 8 values for the parameter.

The second queue 214 also has N rows of queue entries but each row does not correspond to the same time instant or the same transmitted packet. There are in essence 8 sub-queues corresponding to 8 columns of the second queue 214, each sub-queue corresponds to a value of the parameter. There are therefore 8 sub-counters n1 through n8. Each sub-counter keeps track of the number of entries in each sub-queue. As shown in FIG. 3B, the numbers of entries in sub-queues 1, 2, 3, 4, 5, 6, 7, and 8 are N, 2, N, K, N, 2, 3, and N, respectively. The update of the second queue 214 may be performed on each individual sub-queue. Further extensions on this structure of the second queue 214 may be possible. For example, each sub-queue may have different sizes, i.e., different sizes of history window. Each sub-queue may also have different hysteresis mechanisms. In addition, the size and/or the hysteresis mechanism of the sub-queue may be static (i.e., fixed) or dynamic (i.e., variable).

Although the structure of the second queue 214 contain more entries, these entries may correspond to packets transmitted in distant past and therefore may not accurately reflect the current situation. As discussed above, one way to deal with this problem is to weigh the entries in the distant past less than the more recent ones in calculating the performance scores. This weighing scheme may also be applied for the structure of the first queue 212 as well. In addition, the weighing scheme may itself change over time to account for different environmental conditions as discussed.

Figure 3C:
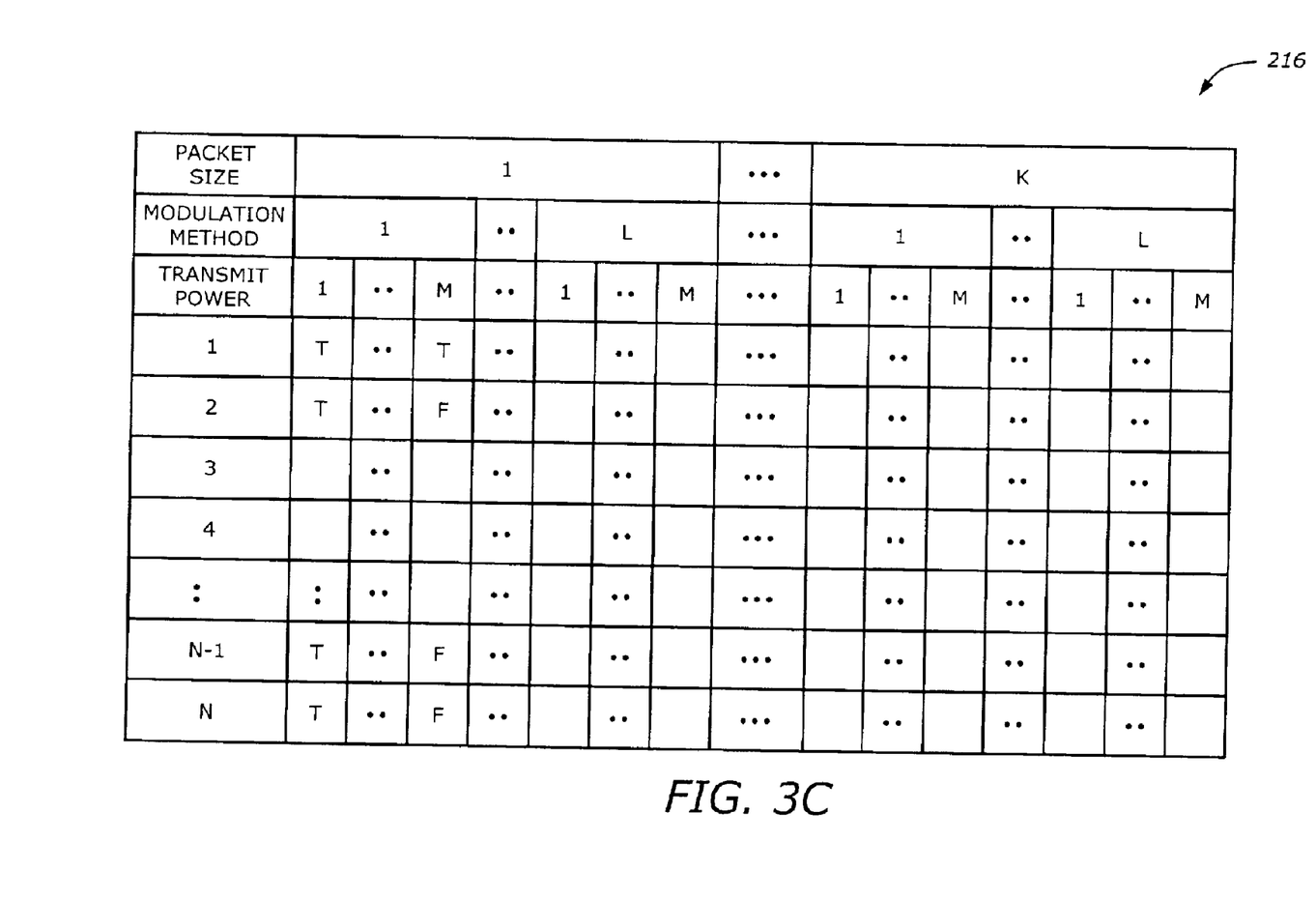
FIG. 3C is a diagram illustrating a queue indexed by multiple parameters according to one embodiment of the invention.

FIG. 3C is a diagram illustrating the third queue 216 indexed by multiple parameters according to one embodiment of the invention. In this illustrative example, the third queue 216 is indexed by three parameters including the packet size, the modulation method, and the transmit power. As is known by one skilled in the art, any number of parameters can be used.

The third queue 216 has N queue entries. There are K values for the packet size, L values for the modulation method, and M values for the transmit power. Therefore, there are KLM sub-queues. For example, if K=10, L=8, and M=3, then the total number of sub-queues or columns in the third queue is 240. Each row in the third queue 216 may correspond to the same time instant or different time instants as discussed in connection with the first queue 212 and 214.

The third queue 216 is similar to the first queue 212 and 214 except that it has multiple parameters. All discussions above for the first and second queues 212 and 214 are also applicable for the third queue 216 and therefore will not be repeated.

Figure 4:
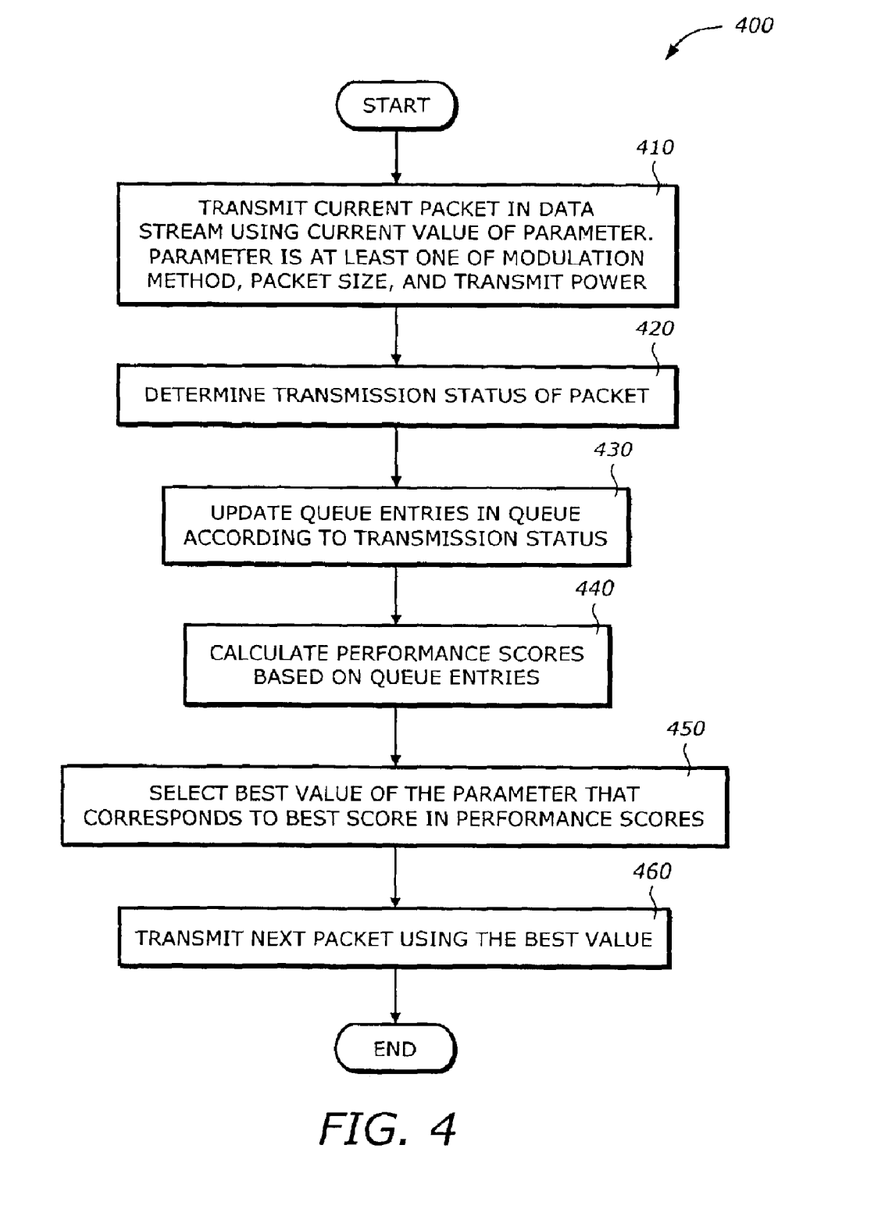
FIG. 4 is a flowchart illustrating a process to adaptively control the generation of transmission parameter values according to one embodiment of the invention.

FIG. 4 is a flowchart illustrating a process 400 to adaptively control the generation of transmission parameter values according to one embodiment of the invention.

Upon START, the process 400 transmits the current packet in the data stream using the current value of the parameter (Block 410). The parameter may be any one of the modulation method, the packet size, the transmit power, any other relevant parameters for communication transmission, or any combination of these. The current packet may be the actual data packet or a probe or dummy packet. Next, the process 400 determines the transmission status of the transmitted current packet (Block 420). This status may be obtained by checking the return acknowledge or any other status reporting technique. The status indicates whether the current packet is transmitted successfully or not.

Then, the process 400 updates the queue entries in the queue according to the transmission status (Block 430). The details of Block 430 will be described in FIG. 5. Next, the process 400 calculates the performance scores for values of the parameter or parameters based on the queue entries (Block 440). The details of Block 440 will be described in FIG. 6. Then, the process 400 selects the best value or values of the parameter or parameters that corresponds or corresponds to the best score in the performance scores (Block 450). Next, the process 400 transmits the next packet using the best value or values of the parameter or parameters (Block 460) and is then terminated.

Figure 5:
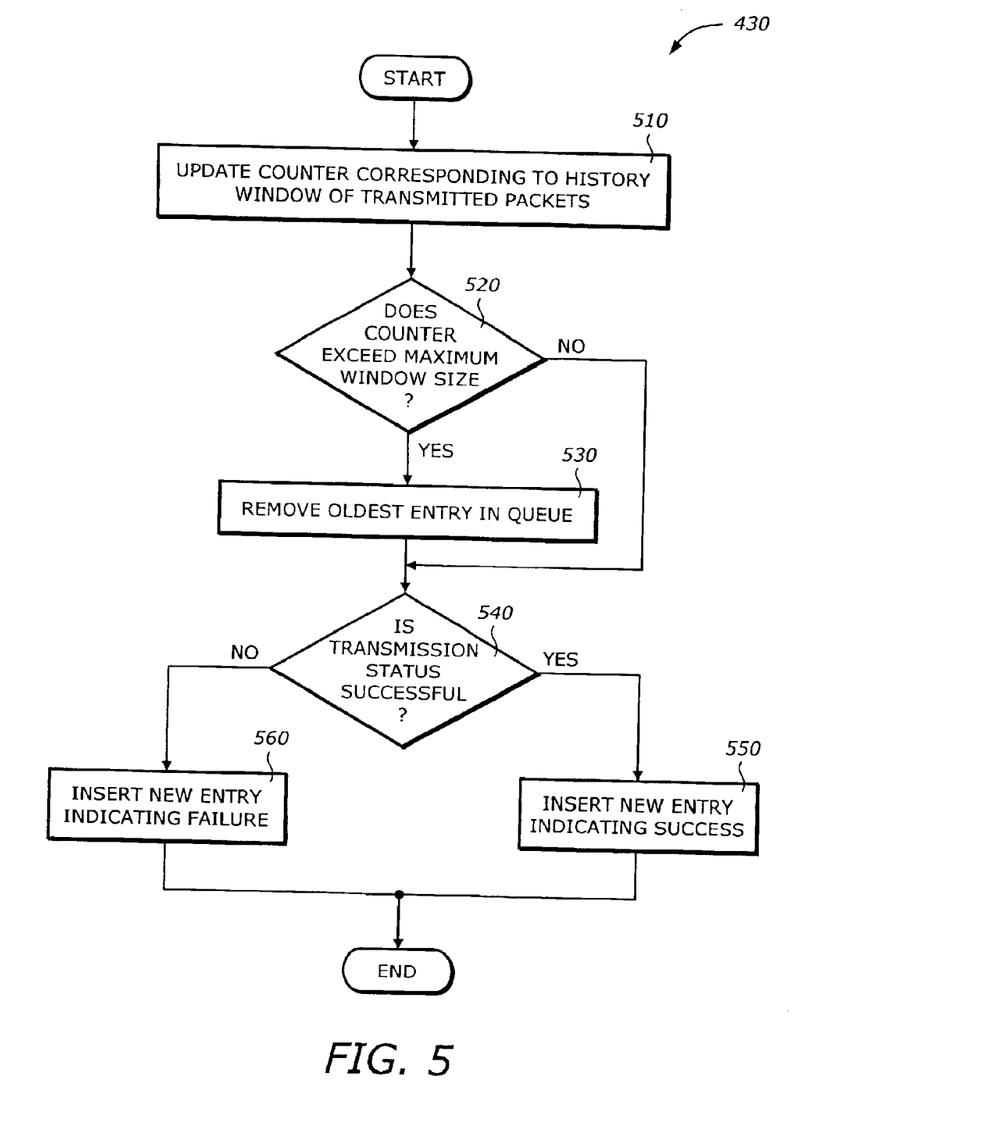
FIG. 5 is a flowchart illustrating a process to update the queue according to one embodiment of the invention.

FIG. 5 is a flowchart illustrating the process 430 to update the queue according to one embodiment of the invention.

Upon START, the process 430 updates a counter corresponding to the history window of the transmitted packets (Block 510). The counter may include many sub-counters if there are multiple parameters. Then, the process 430 determines if the counter exceeds the maximum window size (Block 520). If so, the process 430 removes the oldest entry in the queue to make room for a new entry (Block 530) and then proceeds to Block 540. Otherwise, the process 430 proceeds to Block 540. In Block 540, the process 430 determines if the transmission status is successful (Block 540). In cases where error correction such as FEC with Reed-Solomon or convolutional coding is used, the success status represents only those packets that could be acceptably or completely corrected of errors at the receiver. If it is successful, the process 430 inserts a new entry into the queue indicating success (Block 550) and is then terminated. If it is not successful, the process 430 inserts a new entry into the queue indicating failure (Block 560) and is then terminated.

Figure 6:
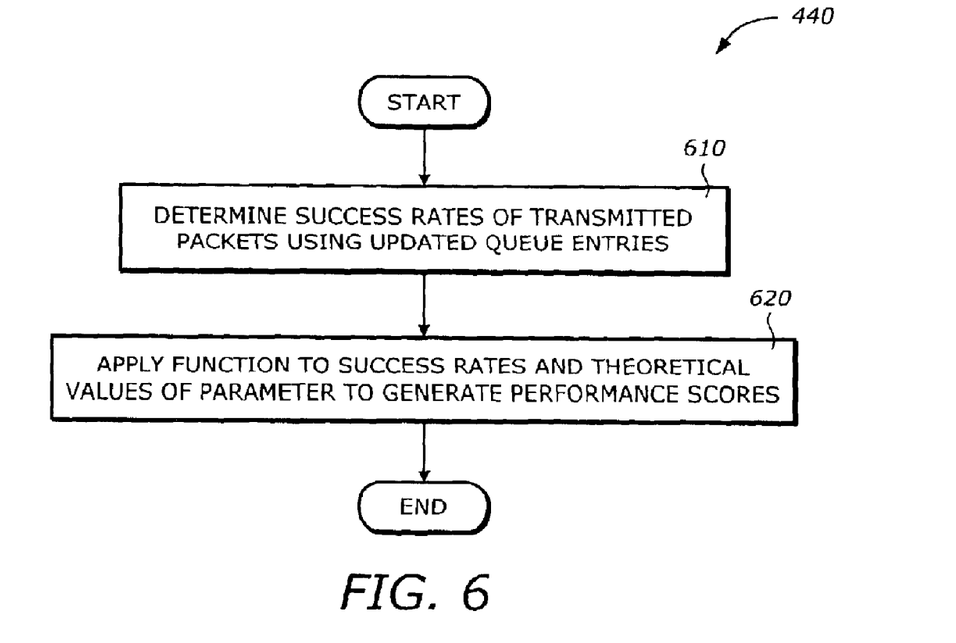
FIG. 6 is a flowchart illustrating a process to calculate the performance scores according to one embodiment of the invention.

FIG. 6 is a flowchart illustrating the process 440 to calculate the performance scores according to one embodiment of the invention.

Upon START, the process 440 determines the success rates of the transmitted packets using the updated queue entries for values of the parameter (Block 610). The success rate for each value of the parameter may be computed by determining the percentage of the successful queue entries in the queue, or counting the number of success queue entries. Then, the process 440 applies a function to the success rates and theoretical values of the parameter to generate the performance scores (Block 620) and is then terminated. The function may be applied for all values of the parameter or a subset of the values, such as the current value, the higher value, and the lower value. The function may be any suitable function that accentuates the maximum performance taking into account the present packet error rate. Examples of this function include multiplication with or without scale factors. The theoretical values are those values that are calculated or estimated for the underlying parameter.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
  updating queue entries in a queue indexed by a parameter according to a transmission status of a current packet in a data stream, the current packet being transmitted using a current value of the parameter;

calculating a plurality of performance scores based on the queue entries; and selecting a best value of the parameter that corresponds to a best score in the plurality of performance scores.

2. The method of claim 1 further comprising:

transmitting a next packet in the data stream using the best value.

3. The method of claim 1 wherein updating comprises:

updating a counter corresponding to a history window of transmitted packets;

removing an oldest entry in the queue if the counter exceeds a maximum window size;

inserting a new entry in the queue indicating the transmission status of the current packet.

4. The method of claim 1 wherein calculating comprises:

determining success rates of transmitted packets using the updated queue entries, the transmitted packets being at least ones of actual data packets and probe packets; and applying a function to the success rates and theoretical values of the parameter, the applied function generating the performance scores.

5. The method of claim 4 wherein applying comprises:

multiplying the success rates with the theoretical values of the parameter.

6. The method of claim 4 wherein applying comprises:

applying the function to the success rates with the theoretical values of the parameter using the current value, a higher value, and a lower value.

7. The method of claim 1 wherein updating comprises:

updating the queue entries in the queue indexed by the parameter, the parameter being one of a modulation method, a packet size, and a transmit power.

8. The method of claim 1 further comprising:

applying a hysteresis to the queue entries.

9. The method of claim 7 wherein the modulation method is one of a binary phase shift keying (BPSK), a quadrature phase shift keying (QPSK), a 16-quadrature amplitude modulation (16-QAM), and a 64-QAM.

10. The method of claim 4 wherein the theoretical values are ones of theoretical throughput data rates assuming no errors and theoretical protocol overhead percentages.

11. An article of manufacture comprising:

a machine-accessible medium including data that, when accessed by a machine, causes the machine to perform operations comprising:

updating queue entries in a queue indexed by a parameter according to a transmission status of a current packet in a data stream, the current packet being transmitted using a current value of the parameter;

calculating a plurality of performance scores based on the queue; and selecting a best value of the parameter that corresponds to a best score in the plurality of performance scores.

12. The article of manufacture of claim 11 wherein the data further comprises data that, when accessed by the machine, causes the machine to perform operations comprising:

transmitting a next packet in the data stream using the best value.

13. The article of manufacture of claim 11 wherein the data causing the machine to perform updating comprises data that, when accessed by the machine, causes the machine to perform operations comprising:

updating a counter corresponding to a history window of transmitted packets;

removing an oldest entry in the queue if the counter exceeds a maximum window size;

inserting a new entry in the queue indicating the transmission status of the current packet.

14. The article of manufacture of claim 11 wherein the data causing the machine to perform calculating comprises data that, when accessed by the machine, causes the machine to perform operations comprising:

determining success rates of transmitted packets using the updated queue entries, the transmitted packets being at least ones of actual data packets and probe packets; and applying a function to the success rates and theoretical values of the parameter, the applied function generating the performance scores.

15. The article of manufacture of claim 14 wherein the data causing the machine to perform applying comprises data that, when accessed by the machine, causes the machine to perform operations comprising:

multiplying the success rates with the theoretical values of the parameter.

16. The article of manufacture of claim 14 wherein the data causing the machine to perform applying comprises data that, when accessed by the machine, causes the machine to perform operations comprising:

applying the function to the success rates with the theoretical values of the parameter using the current value, a higher value, and a lower value.

17. The article of manufacture of claim 11 wherein the data causing the machine to perform updating comprises data that, when accessed by the machine, causes the machine to perform operations comprising:

updating the queue entries in the queue indexed by the parameter, the parameter being one of a modulation method, a packet size, and a transmit power.

18. The article of manufacture of claim 11 the data further comprises data that, when accessed by the machine, causes the machine to perform operations comprising:

applying a hysteresis to the queue entries.

19. The article of manufacture of claim 17 wherein the modulation method is one of a binary phase shift keying (BPSK), a quadrature phase shift keying (QPSK), a 16-quadrature amplitude modulation (16-QAM), and a 64-QAM.

20. The article of manufacture of claim 14 wherein the theoretical values are ones of theoretical throughput data rates assuming no errors and theoretical protocol overhead percentages.

21. A system comprising:

a radio frequency (RF) section to transmit a radio signal from a baseband signal;

a baseband processor coupled to the RF section to generate the baseband signal from a data stream; and a medium access controller (MAC) coupled to the RF section and the baseband processor, the MAC having a processor and a memory containing instructions that causes the processor to:

update queue entries in a queue indexed by a parameter according to a transmission status of a current packet in a data stream, the current packet being transmitted using a current value of the parameter, calculate a plurality of performance scores based on the queue entries, and select a best value of the parameter that corresponds to a best score in the plurality of performance scores.

22. The system of claim 21 wherein the instructions further cause the processor to:

transmit a next packet in the data stream using the best value.

23. The system of claim 21 wherein the instructions causing the processor to update comprises instructions that cause the processor to:

update a counter corresponding to a history window of transmitted packets;

remove an oldest entry in the queue if the counter exceeds a maximum window size;

insert a new entry in the queue indicating the transmission status of the current packet.

24. The system of claim 21 wherein the instructions causing the processor to calculate comprises instructions that cause the processor to:

determine success rates of transmitted packets using the updated queue entries, the transmitted packets being at least ones of actual data packets and probe packets; and apply a function to the success rates and theoretical values of the parameter, the applied function generating the performance scores.

25. The system of claim 24 wherein the instructions causing the processor to apply comprises instructions that cause the processor to:

multiply the success rates with the theoretical values of the parameter.

26. The system of claim 24 wherein the instructions causing the processor to apply comprises instructions that cause the processor to:

apply the function to the success rates with the theoretical values of the parameter using the current value, a higher value, and a lower value.

27. The system of claim 21 wherein the instructions causing the processor to update comprises instructions that cause the processor to:

update the queue entries in the queue indexed by the parameter, the parameter being one of a modulation method, a packet size, and a transmit power.

28. The system of claim 21 the instructions further comprises instructions that cause the processor to:

apply a hysteresis to the queue entries.

29. The system of claim 27 wherein the modulation method is one of a binary phase shift keying (BPSK), a quadrature phase shift keying (QPSK), a 16-quadrature amplitude modulation (16-QAM), and a 64-QAM.

30. The system of claim 24 wherein the theoretical values are ones of theoretical throughput data rates assuming no errors and theoretical protocol overhead percentages.

* * * * *